Jan. 16, 1940.                H. WANG                2,187,337
                          SHEARING CLAMP
                       Filed Aug. 29, 1938           2 Sheets-Sheet 2

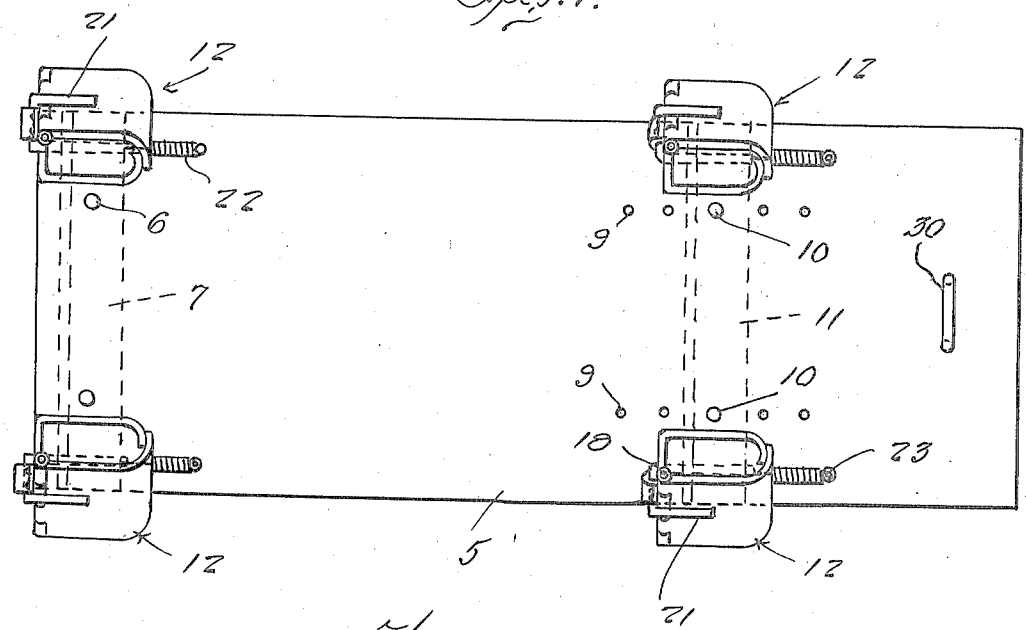
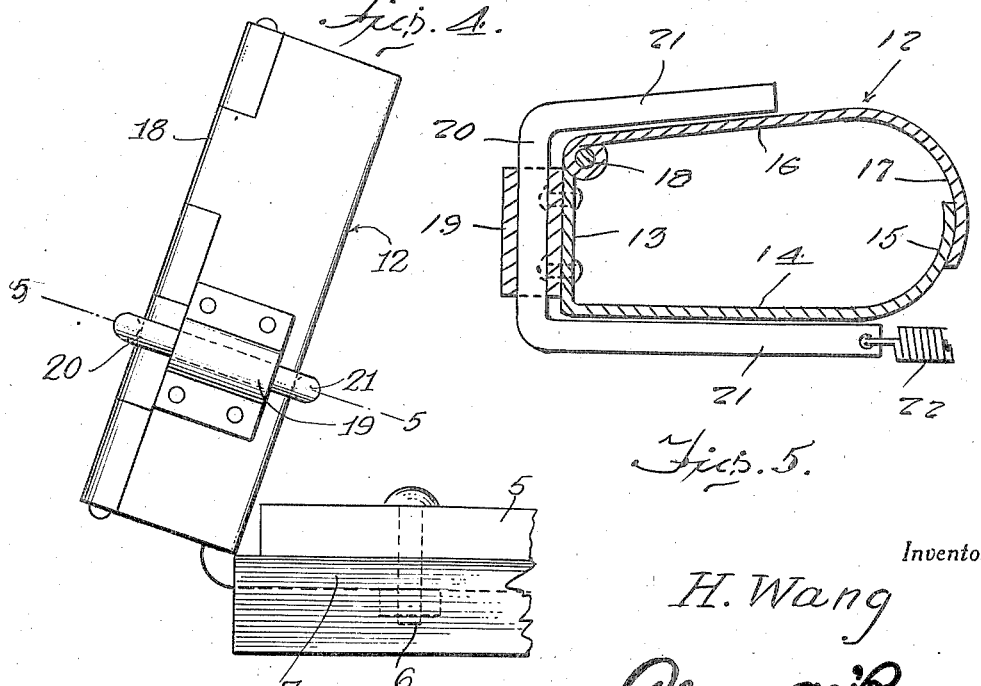

Inventor
H. Wang
By Clarence A. O'Brien
   Hyman Berman
            Attorneys

Patented Jan. 16, 1940

2,187,337

UNITED STATES PATENT OFFICE 2,187,337

SHEARING CLAMP

Harold Wang, Saco, Mont.

Application August 29, 1938, Serial No. 227,399

3 Claims. (Cl. 119—98)

This invention appertains to new and useful improvements in means whereby sheep can be firmly held while being sheared.

The principal object of the present invention is to provide a stand involving clamp means whereby the legs of a sheep can be held firmly while the wool is being sheared from its body.

Another important object of the invention is to provide a device of the character stated which will be positive acting, durable, and not susceptible to the ready development of defects.

These and various other important objects and advantages of the invention will become apparent to the reader of the following specification.

In the drawings:

Figure 1 represents a top plan view of the holding apparatus.

Figure 4 is an enlarged rear elevational view of one of the clamps.

Figure 5 is a sectional view taken substantially on line 5—5 of Figure 4.

Figure 2:
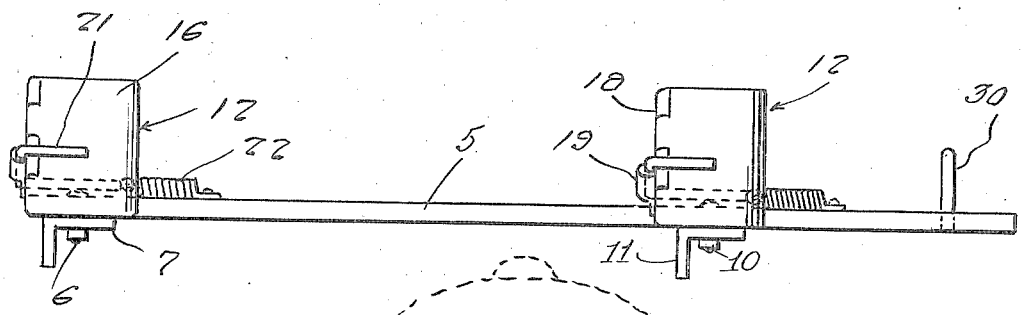
Figure 2 is a side elevational view.
Figure 3:
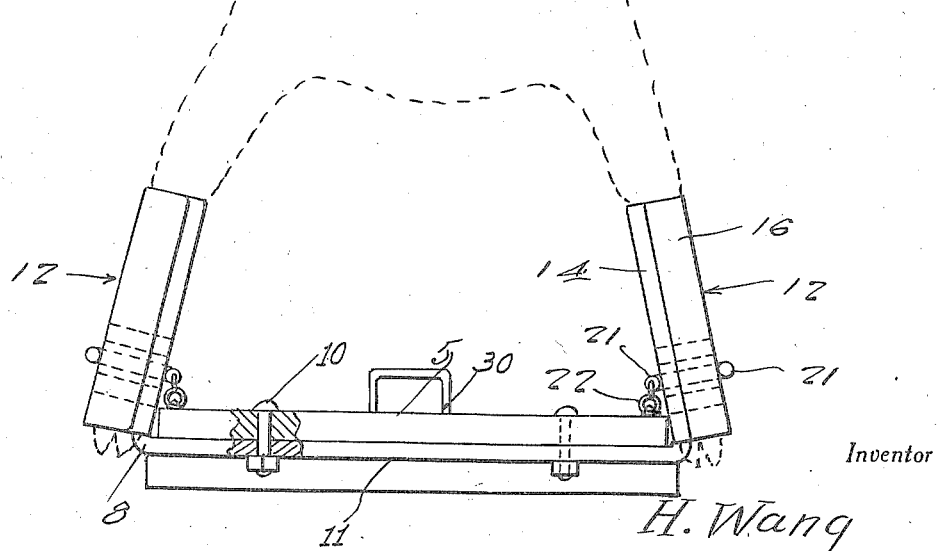
Figure 3 is a front elevational view with a portion in section.

Referring to the drawings wherein like numerals designate parts, it can be seen that numeral 5 represents a platform. To the under side of the platform 5 is secured by bolts 6, an iron strap 7, transversely under the board and this strap has its edge portions bent upwardly as at 8.

The front end portion of the platform 5 has two rows of openings 9 longitudinally extending for selectively receiving the bolts 10 which secure a second strap 11 to the underside of the board and the end portions of this strap 11 are likewise bent upwardly. To the upwardly bent ends of the straps 7 and 11 are secured clamp structures which are generally referred to by numeral 12. These clamp structures each consist of a clamp section made up of the plate 13 having the right angularly disposed wing member 14 which at its free edge portion is curved inwardly as at 15, and a wing member 16 which has its free end portion curved as at 17 to overlap the curved portion 15 of the wing member 14. The wing member 16 is hingedly connected as at 18 to the plate 13. Each of these plates 13 has a bearing 19 on the outer side of the wall 13 and through this is disposed a bight portion 20 of a U-shaped detent which includes leg members 21 extending from the ends of the bight portion 20. Each U-shaped detent has one leg 21 provided with a spring 22 extending therefrom to an anchoring point 23 on the platform 5.

One leg can be clamped after the other and when the legs of a sheep have been firmly clamped, the shearer can put his whole attention on the operation of shearing.

It will be observed that the apparatus when set up for use is rigid, the clamps holding the sheep's legs from hoof to knee anl hock joints to prevent movement in any direction.

As can be seen in Figure 1 numeral 30 represents an eye or staple rising from the platform or board 5 which will permit the board to be connected to a post or support to maintain the board in a vertical position, to the end, that sheep can be sheared while in a sitting position. A rope or the like is trained through the eye 30 entirely around a tree or post.

While the foregoing specification sets forth the invention in specific terms, it is to be understood that numerous changes in the shape, size and materials can be resorted to without departing from the spirit and scope of the invention as claimed hereinafter.

Having described the invention what is claimed as new is:

1. A sheep holder comprising a platform, and a plurality of sheep leg-receiving clamps on the platform each including a stationary and a movable plate member, and straps members extending under the platform and attached to the stationary members of the said clamp structures.

2. In an animal holder, a supporting structure, a clamp mounted on the supporting structure, said clamp being divided into a pair of clamp plates, one of the said clamp plates being provided with a laterally disposed flange at one end thereof, the other clamp plate being hingedly connected to the flange, a bearing on the flange, and a U-shaped detent having its bight portion journaled through the bearing, the leg portions of the detent being adapted to embrace the clamp to hold the plates in clamping position.

3. In an animal holder, a supporting structure, a clamp mounted on the supporting structure, said clamp being divided into a pair of clamp plates, one of the said clamp plates being provided with a laterally disposed flange at one end thereof, the other clamp plate being hingedly connected to the flange, a bearing on the flange, a U-shaped detent having its bight portion journaled through the bearing, the leg portions of the detent being adapted to embrace the clamp to hold the plates in clamping position, and a tension spring having one end connected to one leg portion of the detent and the other end anchored to the supporting structure.

HAROLD WANG.